J. E. DOLAN.
HORSESHOE CALK.
APPLICATION FILED APR. 2, 1909.

936,988.

Patented Oct. 12, 1909.

Witnesses:
Joe. P. Wahler.
J. W. Garner.

Inventor
James E. Dolan
By Victor J. Evans
Attorney

UNITED STATES PATENT OFFICE.

JAMES E. DOLAN, OF GENESEO, NEW YORK.

HORSESHOE-CALK.

936,988. Specification of Letters Patent. Patented Oct. 12, 1909.

Application filed April 2, 1909. Serial No. 487,732.

*To all whom it may concern:*

Be it known that I, JAMES E. DOLAN, citizen of the United States, residing at Geneseo, in the county of Livingston and State of New York, have invented new and useful Improvements in Horseshoe-Calks, of which the following is a specification.

This invention relates to improvements in calks especially adapted for use in connection with horse shoe pads. The object of this invention is to provide an improved form of calk which may be readily attached to a horse shoe pad for use when the ground is coated with ice and which may be removed therefrom when no longer desired.

Figure 1:
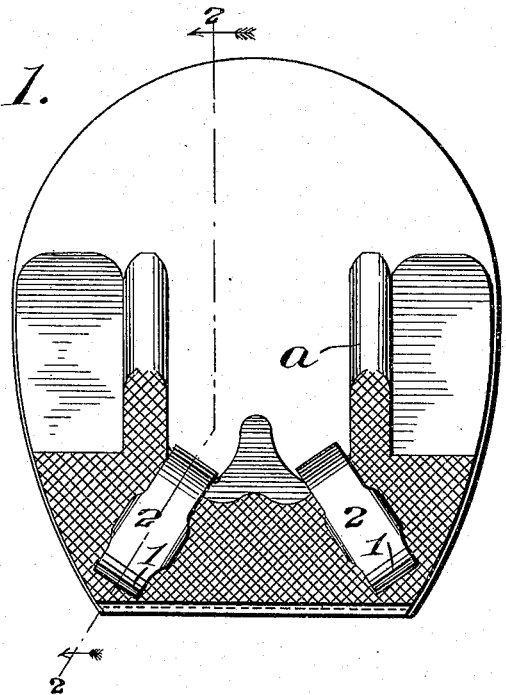
Figure 2:
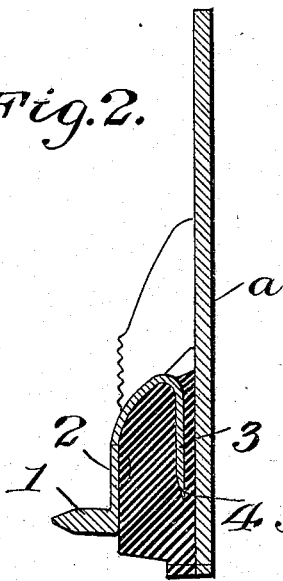
Figure 3:
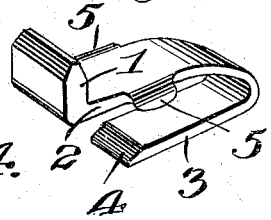
Figure 4:

In the accompanying drawings:—Figure 1 is a plan of a horse shoe pad provided with calks constructed in accordance with my invention. Fig. 2 is a sectional view of the same on the plane indicated by the line 2—2 of Fig. 1. Fig. 3 is a detail perspective view of the calk. Fig. 4 is a detail transverse sectional view of the same.

My improved calk comprises the spur or calk proper indicated at 1, the base 2 formed therewith to bear against the under side of the cross bar or other portion of the horse shoe pad *a*, which *per se* constitutes no portion of my invention, and the shank 3 which extends from and is bent reversely with reference to the base 2 and is disposed substantially parallel with the base. The end of the said reversely bent shank is sharpened or beveled as at 4 to adapt it to readily enter the bar of the pad, which bar is usually made of rubber or other similar material, the base of the calk bearing on the bottom of the said bar as shown in Figs. 1 and 2. At the sides of the base a suitable distance from the spur or calk 1 are lips 5 which are bent upwardly therefrom and serve to enter the bar of the pad.

It will be observed by reference to Fig. 1 that my improved calks are disposed obliquely with reference to the pad in the rear corners thereof and it will be understood that the weight of the horse forces the lips 5 into the bar of the pad and that the said lips coact with the reversely bent shank to firmly secure the calk to the pad so that it will not become casually detached therefrom.

The opening in the front side of the bar for the reception of the shank 3 of the calk may be made either prior to or formed by the application of the calk to the pad and I do not desire to limit myself in this particular.

What is claimed is:—

The herein described calk for use on a horseshoe pad, and comprising a spur, a base portion at the upper end of the spur, extending forwardly therefrom to bear on the bottom of the bar of the pad, said base portion having upturned lips at its sides to enter the bottom of the bar of the pad, and a shank extending forwardly and upwardly from the base portion, to bear on the front side of the bar of the pad and terminating in a rearwardly extending portion, disposed parallel with the base portion, to enter the bar of the pad.

In testimony whereof I affix my signature in presence of two witnesses.

JAMES E. DOLAN.

Witnesses:
WILLIAM J. FLYNN,
FRED A. QUIRK.